United States Patent

[11] 3,547,150

| [72] | Inventor | Robert E. Geiger<br>Sayre, Pa. |
|---|---|---|
| [21] | Appl. No. | 815,104 |
| [22] | Filed | April 10, 1969 |
| [45] | Patented | Dec. 15, 1970 |
| [73] | Assignee | Ingersoll-Rand Company<br>New York, N.Y.<br>a corporation of New Jersey |

[54] HOIST CONTROL VALVE
7 Claims, 3 Drawing Figs.

[52] U.S. Cl. .................................................. 137/599,
137/625.28, 137/512.3, 137/505.38; 254/168
[51] Int. Cl. ...................................................... F16k 11/00,
F16k 15/00; B66d 1/44
[50] Field of Search ............................................ 137/596,
599, 512—512.4, 505.38, 505.42, 625.28;
254/168, 186

[56] References Cited
UNITED STATES PATENTS
| 1,498,477 | 6/1924 | Nichles | 137/512.3 |
| 3,260,508 | 7/1966 | Powell | 254/168 |
| 3,384,350 | 5/1968 | Powell | 254/168 |
| 3,481,583 | 12/1969 | Ulbing | 254/186 |

*Primary Examiner*—William R. Cline
*Attorney*—Carl R. Horten

ABSTRACT: A pendent control for a fluid-actuated balance hoist having a movable cup-shaped flexible valve for shifting to a plurality of pilot pressures for controlling the hoist and having a rotatable turret carrying a plurality of adjustable springs for selectively applying preset spring loads to regulator valves which determine the pilot pressures.

PATENTED DEC 15 1970
3,547,150
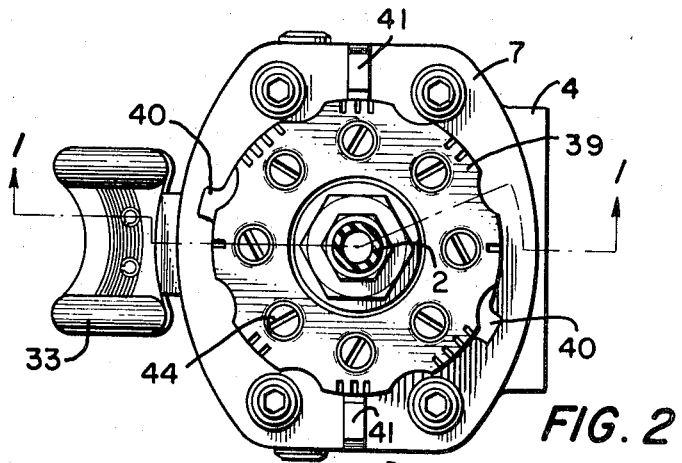
FIG. 2
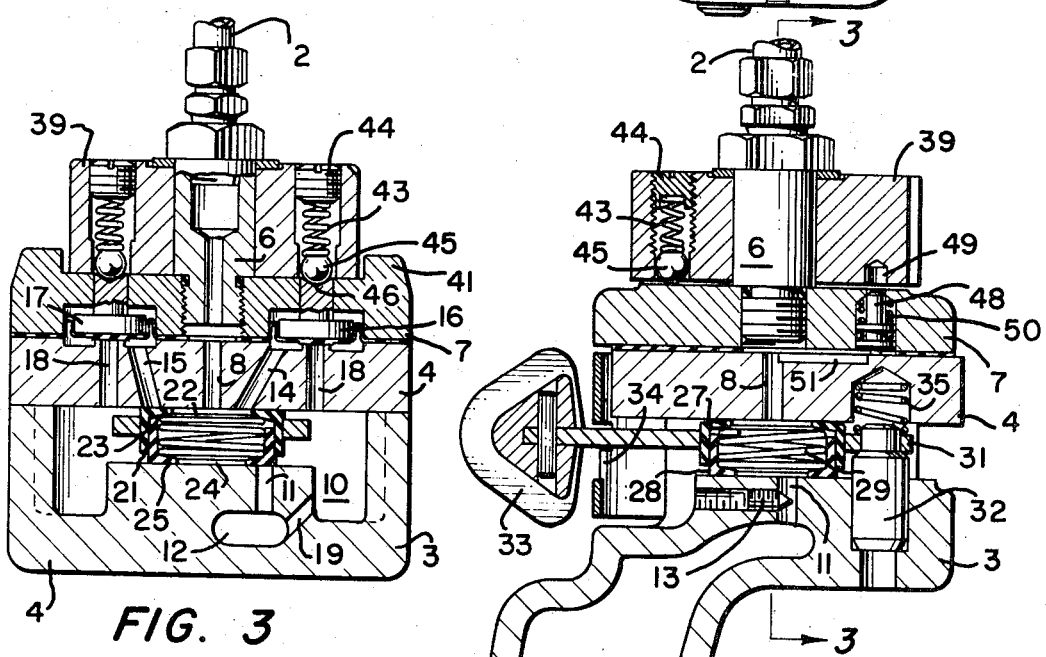
FIG. 3
FIG. 1
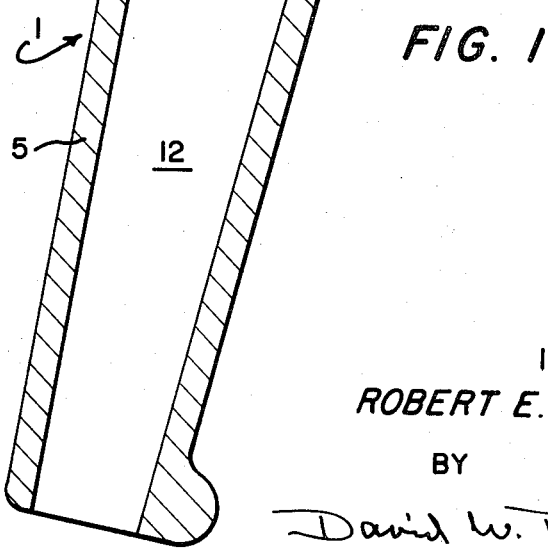
INVENTOR
ROBERT E. GEIGER
BY
David W. Tilbott
ATTORNEY

HOIST CONTROL VALVE

BACKGROUND OF INVENTION

This invention relates to a control member for fluid operating devices and more particularly to a pendent control for a fluid-operated balance hoist. An example of a fluid-operated balance hoist is disclosed in U.S. Pat. No. 3,421,737, issued Jan. 14, 1969.

The pendent control shown in U.S. Pat. No. 3,421,737 has two positions for providing selected predetermined balancing pressures to a hoist. If an operator desires a balancing pressure other than either of these two positions, he must adjust one position to the new pressure, thereby losing the original preset pressure at that position that he might wish to return to later.

SUMMARY OF INVENTION

The principal object of this invention is to provide an improved pendent control for a fluid balance hoist having means for easily and quickly providing additional preset balance pressures while retaining the original preset balance pressures.

Other important objects are: to provide a novel improvement in controls for fluid-operated hoists; to provide an improved pendent control having additional preset pressure means with latch means to prevent the preset pressure from being shifted while the pendent control valve is in an operative position providing a selected balancing pressure; and to provide an improved pendent control which is relatively simple to operate and to adjust to selected balancing pressures.

In general, these objects are attained by movably mounting an element such as a turret on the pendent control, positioning a plurality of adjustable springs in the element which can be adjusted to selected spring loads and moving the element so that individual springs can act upon the regulator valve which creates the pilot pressure. In other words, each regulator valve has several preset springs which can be selectively moved into position to act on and to control the valve. Only one spring is acting on the regulator valve at one time.

BRIEF DESCRIPTION OF DRAWING

The invention is described in connection with the accompanying drawing wherein:

FIG. 1 is a vertical section taken on the line 1—1 in FIG. 2 showing a pendent control for a balance hoist having a movable turret top containing a plurality of regulator valve springs adapted to be adjusted to different selected loads and selectively moved to positions bearing on the regulator valves;

FIG. 2 is a top view of the pendent control of FIG. 1; and

FIG. 3 is a vertical section taken on the line 3—3 in FIG. 1.

DESCRIPTION OF PREFERRED EMBODIMENT

The pendent control 1 shown in FIGS. 1 to 3 is intended to be used with a fluid-actuated (pneumatic pressure) balancing hoist such as shown in U.S. Pat. No. 3,421,737, issued Jan. 14, 1969, to O. M. Ulbing. In general, this balancing hoist includes a casing containing a hoist drum carrying a hoist cable. The casing and drum together form an air chamber and the drum is mounted on threads in a manner so that air pressure in the chamber resists the lowering of the hoist cable. Pressure in the chamber is adjusted to generally balance a load on the hoist cable so that the load can be lifted or moved with relatively little effort supplied by a workman. If the weight of the load is substantially changed, the pressure in the air chamber must be changed to rebalance the load.

Normally, the pressure in the air chamber is controlled by a pilot-operated pressure regulator valve controlled by a pilot pressure determined by the pendent control 1. The pendent control 1 is connected to the pressure regulator valve by a pilot pressure hose 2 and provides a selected predetermined pilot pressure by venting or exhausting at a regulated rate an air pressure supplied to the pilot pressure hose 2.

The pendent control 1 includes a body 3 comprising a head 4 and a depending hand grip 5. The pilot pressure hose 2 is connected to an elongated fitting 6 that threads into a cap plate 7 forming a part of the head 4. The fitting 6 connects to an inlet port 8 provided in the body 3 and opening into a valve chamber 10 contained in the body 3. The floor of the valve chamber 10 contains an exhaust port 11 which opens into a hollow passage 12 provided in the hand grip 5. The hollow passage 12 is open to the atmosphere at its lower end, thereby allowing the exhaust port 11 to vent to the atmosphere. The exhaust port 11 includes a threaded needle valve 13 for adjustably controlling the venting rate of the exhaust port 11.

The top of the valve chamber 10 includes a pair of bleed passages 14 and 15 extending to respective diaphragm or pressure regulator valves 16 and 17. Each regulator valve closes and opens a vent passage 18 and includes a spring for determining the pressure magnitude under which the regulator valve opens and closes. Each vent passage 18 empties into the sides of the valve chamber 10 which dumps into the hollow passage 12 through an additional passage 19. The operation of the regulator valves 16 and 17 is conventional. Hence, it is believed that it is only necessary to explain that the pressure in the bleed passages 14 and 15 is substantially balanced by the spring on top of the regulator valve. If a balance is not present, the valve automatically opens or closes sufficiently to lower or raise the pressure until the proper balancing pressure is achieved. The specific structure of the springs for loading the regulator valves 16 and 17 will be described later.

The valve chamber 10 contains a hollow cup-shaped valve 21 of flexible material such as Teflon. The valve 21 has a top opening 22 surrounded by an inwardly and upwardly converging rim or lip 23 which engages the top or ceiling of the valve chamber 10 and seals the interior of the valve 21 from its exterior. In addition, the bottom of the valve 21 contains a lower axial opening 24 surrounded by a flexible lower lip 25 resiliently engaging the floor of the valve chamber 10 to seal the interior of the valve 21 from its exterior.

The flexible valve member 21 is formed of a pair of cylindrical cups 27 and 28 having telescoping circumferential sides. The telescoping cups 27 and 28 house a compression spring 29 which engages the inside of the lips 23 and 25 and urges the cups 27 and 28 apart against the walls of the valve chamber 10. The use of the telescoping cups 27 and 28 allows the flexible valve chamber 21 to accommodate variations in the size of the chamber 10.

The cup valve 21 is movable to three different positions. In one position, the valve 21 interconnects the inlet port 8 to the exhaust port 11 by having its lower opening 24 aligned with the exhaust port 11.

In the midposition, shown in FIG. 3, the valve 21 is no longer open to the exhaust port 11 and the inlet port 8 is open to the bleed passage 14 whereby the regulator valve 16 controls the pressure in the inlet port 8.

In a third position, the valve 21 is located wherein the inlet port 8 is connected to the bleed passage 15 of the regulator valve 17 and the bleed passage 14 is disconnected from the inlet port 8.

The cup valve 21 is shifted between the foregoing three positions by a ring 31 which loosely circles the cup valve 21 and is pivoted in the valve chamber 10 on a pin 32. The ring 31 includes an integral handle 33 extending from the head 4 of the pendent control 1 for pivoting the ring 31 about its pivot pin 32. The handle 33 of the valve shifter ring 31 extends through a substantially Z-shaped slot 34 which controls and allows the handle 33 to be shifted to its three positions. A spring 35 presses down on the portion of the ring 31 pivoted on the pin 32 so that the handle 33 normally remains in the upper portion of the Z-shaped slot 34. Thus, the slot 34 prevents the handle 33 from being accidentally moved to the full exhaust position. In order to move the handle 33 to the exhaust position, the operator must press downward on the handle 33 against the spring 35 and then shift the handle sidewise in the lower leg of the Z-shaped slot 34.

A turret disc 39 is rotatably pivoted on the elongated fitting 6 on top of the cap 7 and contains several depressions in its periphery to aid an operator in grasping and rotating it. The turret disc 39 can be rotated through an arc of 135° and includes a pair of tangs 40 extending radially from opposite sides and adapted to engage a pair of abutment stops 41 fixed on the cap plate 7.

The rotatable turret disc 39 carries four pairs of springs 43 circumferentially spaced around its axis and adapted to selectively apply spring loads to the regulator valves 16 and 17. Each pair of springs 43 is located in the turret disc 39 diametrically opposite each other. Each spring 43 is located between an adjustment screw 44 threaded in the turret disc 39 and bearing on top of the spring 43 and a ball 45 engaged by the bottom of the spring. The screws 44 are used to vary and adjust the tension of its spring 43 to preset spring loads.

As shown in FIG. 3, each regulator valve 16 and 17 includes a plunger, also designated 16 and 17, sliding vertically in the cap plate 7. The top of each valve plunger 16 and 17 carries a recess or seat 46 adapted to receive a ball 45. When the turret disc 39 is rotated to a position where balls 45 are seated on the valve plungers 16 and 17, the valves 16 and 17 will regulate the air pressure in the valve 21 in response to the load of the particular springs bearing on the regulator valves 16 and 17. These spring loads can be readily changed to various preset spring loads, eight shown in the drawing, simply by turning the turret disc 39 to its various positions wherein selected springs 43 bear on the valve plungers 16 and 17.

Means is provided for latching the turret disc 39 in whatever position it may be in whenever the handle 33 is located in a position to create a pilot pressure in the valve 21. This means includes a latch piston 48 sliding in the cap plate 7 and adapted, when urged upward, to enter one of a series of holes 49 provided in the bottom of the turret disc 39. The latch piston 48 is urged downwardly by a spring 50 and upwardly by air pressure fed to its bottom face through a branch passage 51 opening into the inlet port 8. Although not shown in the drawing, the bottom of the turret disc 39 is provided with sufficient holes 49, four in the embodiment shown in the drawing, to latch the disc 39 in each of its operative positions. The latch 48 will be retracted whenever the control handle 33 is moved to a position wherein the valve 21 is exhausted, thereby reducing the pilot air pressure in the hose 2 to substantially zero.

Although a single embodiment of the invention is illustrated and described in detail, it should be understood that the invention is not limited merely to this embodiment, but contemplates other embodiments and variations which utilize the concepts and teachings of this invention.

I claim:
1. A control member for a fluid-operated balance hoist, having a control valve movable to at least two positions, one in which the valve applies a selected regulated control pressure to the fluid-operated hoist, including:
   a valve body containing a plurality of ports including a first port adapted to be connected to the hoist and a second port containing a pressure regulator valve adapted to regulate the pressure in said first port to maintain such pressure at a predetermined selected pressure;
   an element movably mounted on said valve body and containing a plurality of adjustable springs adapted selectively to bear upon said pressure regulator valve with a variety of different selected forces to render the regulator valve operative to regulate the pressure in said first port in response to the spring load of a spring bearing on said pressure regulator valve; and
   means for adjusting the tension of the springs to different preset selected loads whereby the regulated pressure of said regulator valve can be changed to different selected pressures by moving said element to different positions wherein different springs bear on said regulator valve.
2. The control member of claim 1 wherein: said element is a turret rotatably mounted on said valve body and arranged to be rotated to several positions wherein said different springs bear upon said regulator valve.
3. The control member of claim 2 wherein: said regulator valve controls and creates its selected pressure by exhausting pressure from said first port at a regulated rate.
4. The control member of claim 3 including: latch means operative to lock said turret in a selected position when a selected pressure is maintained in said first port and operative to release said turret when said first port is exhausted.
5. The control member of claim 4 wherein: said control member is a pendent control and has a hand grip adapted to be grasped by an operator.
6. The pendent control of claim 5 including: a valve chamber provided in said valve body and containing said control valve with said control valve being movable between a position connecting said regulator valve to said first port and a position exhausting said first port.
7. The pendent control of claim 6 wherein: said regulator valve is vented into a portion of said valve chamber outside of said control valve and said portion of said valve chamber is vented through a passage extending through said hand grip.